(12) United States Patent
Hotta et al.

(10) Patent No.: US 11,990,950 B2
(45) Date of Patent: May 21, 2024

(54) COMMUNICATION NETWORK SYSTEM

(71) Applicant: DAIKIN INDUSTRIES, LTD., Osaka (JP)

(72) Inventors: Kosuke Hotta, Osaka (JP); Shin Higashiyama, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/220,146

(22) Filed: Jul. 10, 2023

(65) Prior Publication Data

US 2023/0353192 A1 Nov. 2, 2023

Related U.S. Application Data

(63) Continuation of application No. PCT/JP2022/001242, filed on Jan. 14, 2022.

(30) Foreign Application Priority Data

Jan. 14, 2021 (JP) ................................. 2021-004300

(51) Int. Cl.
*H04B 3/44* (2006.01)
*H04B 3/30* (2006.01)
*H04B 3/46* (2015.01)

(52) U.S. Cl.
CPC .............. *H04B 3/44* (2013.01); *H04B 3/30* (2013.01); *H04B 3/46* (2013.01)

(58) Field of Classification Search
CPC ... H04B 3/54; H04B 3/44; H04B 3/46; H04B 3/30; H04B 3/462; H04B 3/466; H04B 3/48; H04B 17/00; H04B 17/30
See application file for complete search history.

(56) References Cited

U.S. PATENT DOCUMENTS 6,290,141 B1 * 9/2001 Park .................... F24F 11/88
236/51
8,266,919 B2 * 9/2012 Okano .................. F24F 11/30
700/277

(Continued)

FOREIGN PATENT DOCUMENTS

JP 8-125675 A 5/1996
JP 2002-323253 A 11/2002

(Continued)

OTHER PUBLICATIONS

International Search Report of corresponding PCT Application No. PCT/JP2022/001242 dated Mar. 1, 2022.

(Continued)

*Primary Examiner* — Khanh C Tran
(74) *Attorney, Agent, or Firm* — Global IP Counselors, LLP

(57) ABSTRACT

An air-conditioning apparatus includes a first transmission channel, a plurality of second transmission channels different from the first transmission channel, a controller connected to the first transmission channel and not connected to the second transmission channels, a plurality of air-conditioning indoor units connected to the second transmission channels and not connected to the first transmission channel, and a plurality of air-conditioning outdoor units. The plurality of air-conditioning outdoor units electrically connect the first transmission channel and the second transmission channels, and do not transmit a short-circuit state occurring in one of the first transmission channel and the second transmission channels to a transmission channel other than the one of the first transmission channel and the second transmission channels, thereby enabling communication between devices connected to the transmission channel other than the one.

15 Claims, 11 Drawing Sheets

(56) References Cited

U.S. PATENT DOCUMENTS

| | | |
|---|---|---|
| 2017/0061756 A1 | 3/2017 | Kim et al. |
| 2021/0140669 A1* | 5/2021 | Wang ................... F24F 11/56 |
| 2021/0199334 A1* | 7/2021 | Tan ..................... F24F 11/89 |
| 2021/0262683 A1* | 8/2021 | Ota ..................... F24F 11/63 |

FOREIGN PATENT DOCUMENTS

| | | |
|---|---|---|
| JP | 2009-230492 A | 10/2009 |
| JP | 2017-510917 A | 4/2017 |

OTHER PUBLICATIONS

International Preliminary Report of corresponding PCT Application No. PCT/JP2022/001242 dated Jul. 27, 2023.

* cited by examiner

COMMUNICATION NETWORK SYSTEM

CROSS-REFERENCE TO RELATED APPLICATIONS

This is a continuation of International Application No. PCT/JP2022/001242 filed on Jan. 14, 2022, which claims priority to Japanese Patent Application No. 2021-004300, filed on Jan. 14, 2021. The entire disclosures of these applications are incorporated by reference herein.

BACKGROUND

Technical Field

The present disclosure relates to a communication network system including, for example, an air-conditioning outdoor unit.

Background Art

As described in Japanese Patent No. 4169489, an air-conditioning system including a plurality of air-conditioning outdoor units, a plurality of air-conditioning indoor units, and a communication network connecting these units is known.

In the air-conditioning system, for example, one air conditioner refrigerant system is configured by connecting one outdoor unit and a plurality of indoor units with a communication line. Furthermore, by connecting a plurality of outdoor units with a communication line, communication between different air conditioner refrigerant systems becomes possible. Further, a controller may be installed so as to be able to communicate with a plurality of outdoor units. In this case, the controller can control all the outdoor units and all the indoor units belonging to the air-conditioning system.

SUMMARY

The communication line includes a plurality of conductive wires, such as two conductive wires, for example. In this case, an operator who installs the air-conditioning system may erroneously short-circuit the two conductive wires. Depending on the design of the communication network included in the air-conditioning system, all the outdoor units and all the indoor units belonging to the air-conditioning system may become inoperable due to such a short circuit of the communication line. Therefore, a design is desired in which a short circuit at a certain point of the communication line does not interfere with the operation of the devices belonging to the air-conditioning system.

A communication network system of an aspect includes a first transmission channel, a second transmission channel, a first device, a second device, and a third device. The second transmission channel is different from the first transmission channel. The first device is connected to the first transmission channel and is not connected to the second transmission channel. The second device is connected to the second transmission channel and is not connected to the first transmission channel. The third device electrically connects the first transmission channel and the second transmission channel. The third device does not transmit a short-circuit state occurring in one of the first transmission channel and the second transmission channel to the transmission channel other than the one of the first transmission channel and the second transmission channel, thereby enabling communication between the devices connected to the transmission channel other than the one.

According to this configuration, a short-circuit state occurring in one of the first transmission channel and the second transmission channel is not transmitted to the other. Therefore, the devices connected to the transmission channel in which a short circuit is not occurring can communicate.

An air-conditioning outdoor unit according to another aspect electrically connects a first transmission channel and a second transmission channel different from the first transmission channel. The air-conditioning outdoor unit constitutes an air-conditioning apparatus in cooperation with a controller and an air-conditioning outdoor unit. The air-conditioning outdoor unit does not transmit a short-circuit state occurring in one of the first transmission channel and the second transmission channel to the transmission channel other than the one of the first transmission channel and the second transmission channel, thereby enabling communication of a device connected to the transmission channel other than the one.

According to this configuration, the air-conditioning outdoor unit is less likely to be adversely affected by a communication failure.

DETAILED DESCRIPTION OF EMBODIMENT(S)

First Embodiment (1) Overall Configuration

Figure 1:
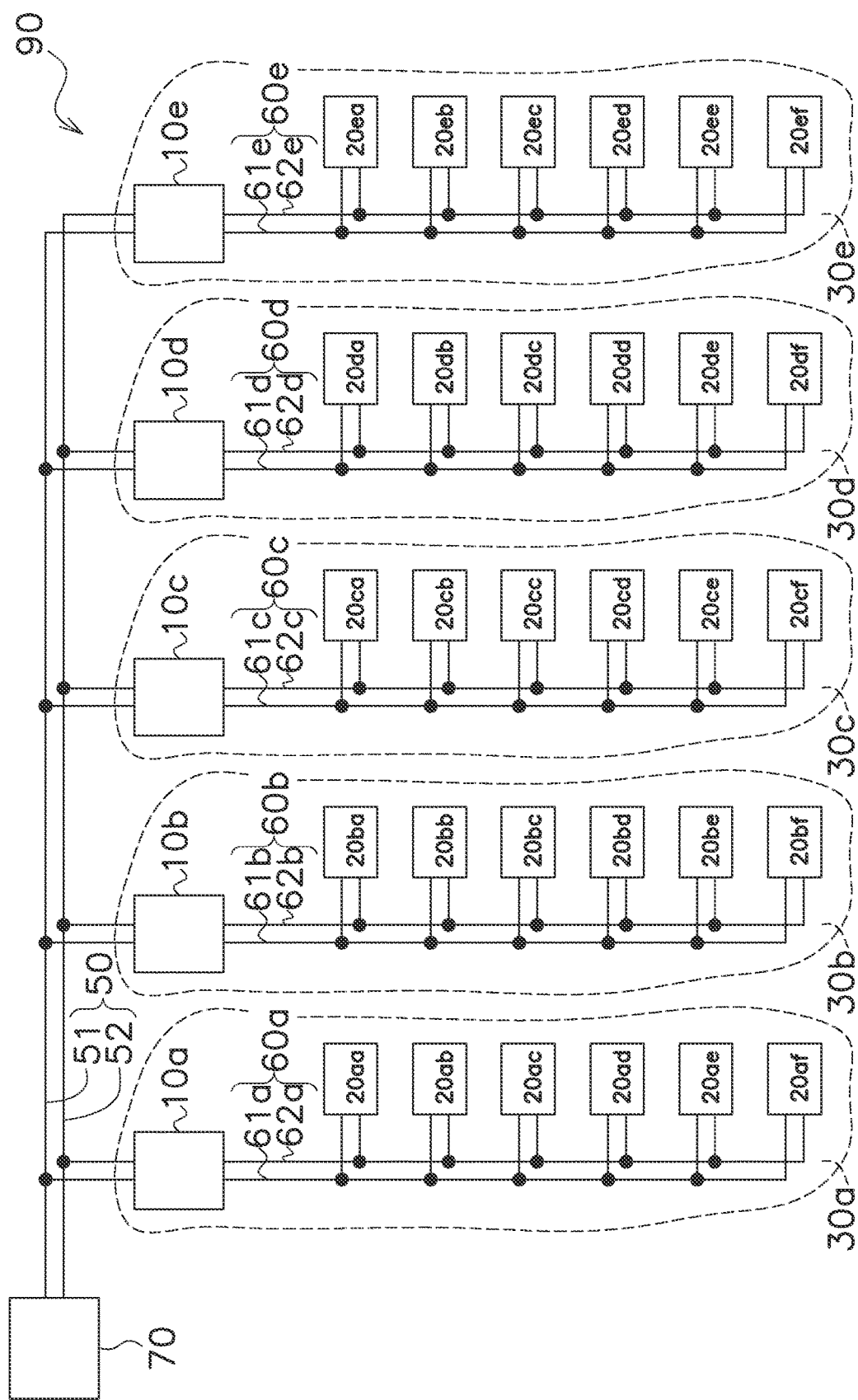
FIG. 1 is a schematic diagram of a circuit of a communication network system 90 constituting an air conditioner.

FIG. 1 shows a circuit of a communication network system 90 according to a first embodiment of the present disclosure. The communication network system 90 constitutes an air-conditioning system. The communication network system 90 includes a controller 70, a plurality of air-conditioning outdoor units 10a to 10e, a plurality of air-conditioning indoor units 20aa to 20ef, a first transmission channel 50, and a plurality of second transmission channels 60a to 60e.

(2) Detailed Configuration (2-1) Controller 70

The controller 70 is a device configured to control all of the air-conditioning outdoor units 10a to 10e and the air-conditioning indoor units 20aa to 20ef.

(2-2) Air-Conditioning Outdoor Units 10a to 10e

The air-conditioning outdoor units 10a to 10e constitute air conditioner refrigerant systems 30a to 30e, respectively, and function as heat sources.

(2-3) Air-Conditioning Indoor Units 20aa to 20ef

Each of the air-conditioning indoor units 20aa to 20ef provides conditioned air to a user.

The air-conditioning indoor units 20aa to 20af, together with the air-conditioning outdoor unit 10a, belong to the air conditioner refrigerant system 30a. The air-conditioning indoor units 20ba to 20bf, together with the air-conditioning outdoor unit 10b, belong to the air conditioner refrigerant system 30b. The air-conditioning indoor units 20ca to 20cf, together with the air-conditioning outdoor unit 10c, belong to the air conditioner refrigerant system 30c. The air-conditioning indoor units 20da to 20df, together with the air-conditioning outdoor unit 10d, belong to the air conditioner refrigerant system 30d. The air-conditioning indoor units 20ea to 20ef, together with the air-conditioning outdoor unit 10e, belong to the air conditioner refrigerant system 30e.

In each of the air conditioner refrigerant systems 30a to 30e, a refrigerant circuit not shown in FIG. 1 is configured.

(2-4) First Transmission Channel 50

The first transmission channel 50 connects the controller 70 to all of the plurality of air-conditioning outdoor units 10a to 10e. The first transmission channel 50 connects the plurality of air conditioner refrigerant systems 30a to 30e to each other.

The first transmission channel 50 includes a first communication line 51 and a second communication line 52.

(2-5) Second Transmission Channels 60a to 60e

The second transmission channels 60a to 60e are each a transmission channel different from the first transmission channel 50.

Each of the second transmission channels 60a to 60e is connected to any of the air-conditioning outdoor units 10a to 10e and to any of the air-conditioning indoor units 20aa to 20ef, thereby constituting one of the air conditioner refrigerant systems 30a to 30e.

The second transmission channels 60a to 60e include third communication lines 61a to 61e and fourth communication lines 62a to 62e, respectively.

(3) Arrangement of Each Device

The controller 70 is connected to the first transmission channel 50. The controller 70 is not connected to any of the second transmission channels 60a to 60e.

Each of the air-conditioning indoor units 20aa to 20ef is connected to one of the second transmission channels 60a to 60e. None of the air-conditioning indoor units 20aa to 20ef is connected to the first transmission channel 50.

Each of the air-conditioning outdoor units 10a to 10e electrically connects the first transmission channel 50 to one of the second transmission channels 60a to 60e.

(4) Configuration of Air-Conditioning Outdoor Units 10a to 10e

Figure 2:
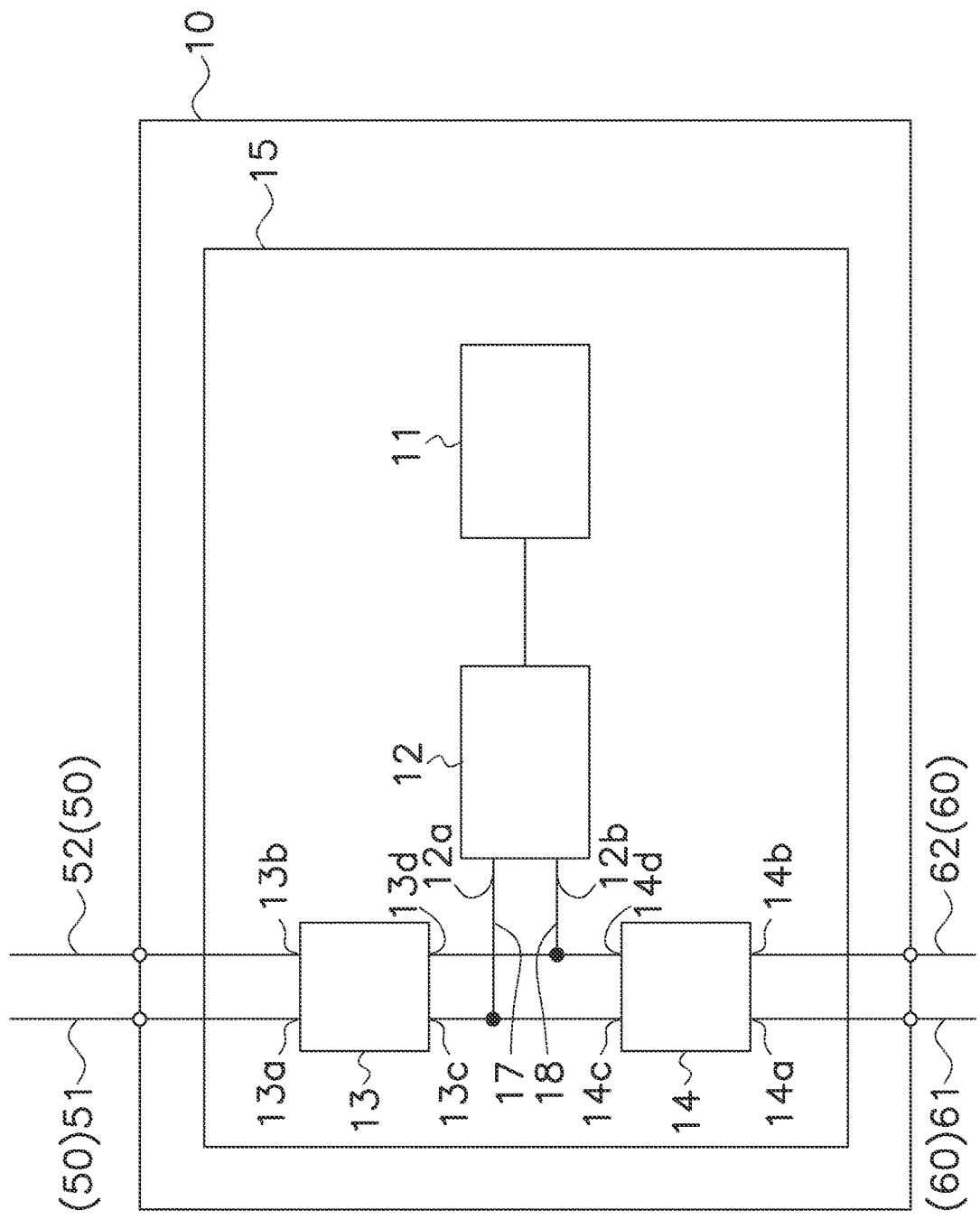
FIG. 2 is a block diagram of an air-conditioning outdoor unit 10 according to a first embodiment.

FIG. 2 shows an internal configuration of an air-conditioning outdoor unit 10. The internal configurations of the plurality of air-conditioning outdoor units 10a to 10e shown in FIG. 1 are identical or similar to the configuration of the air-conditioning outdoor unit 10 shown in FIG. 2.

As shown in FIG. 2, the air-conditioning outdoor unit 10 includes a refrigerant circuit control unit 11, a communication unit 12, a first impedance component 13, a second impedance component 14, and a circuit board 15. The circuit board 15 includes a first internal wire 17 and a second internal wire 18. At least the first impedance component 13 and the second impedance component 14 are mounted on the circuit board 15. The refrigerant circuit control unit 11 and the communication unit 12 may also be mounted on the circuit board 15.

The refrigerant circuit control unit 11 controls a refrigerant circuit, which is not shown in FIG. 2. The refrigerant circuit includes a compressor, an expansion valve, a fan motor, a heat exchanger, various sensors, and the like.

The communication unit 12 transmits and receives signals to and from devices other than the air-conditioning outdoor unit 10. The communication unit 12 transmits a command received from the controller 70 to the refrigerant circuit control unit 11. The communication unit 12 acquires the state of the air-conditioning indoor units 20aa to 20ef from the refrigerant circuit control unit 11. The communication unit 12 includes a first terminal 12a and a second terminal 12b. The first terminal 12a is connected to the first internal wire 17. The second terminal 12b is connected to the second internal wire 18.

The first impedance component 13 is a circuit having a predetermined impedance. The first impedance component 13 is disposed between the first transmission channel 50 and the communication unit 12.

The second impedance component 14 is a circuit having a predetermined impedance. The second impedance component 14 is disposed between the second transmission channel 60 (that is, any one of the plurality of second transmission channels 60a to 60e described above) and the communication unit 12.

The impedances of the first impedance component 13 and the second impedance component 14 are both larger than the characteristic impedance of the first transmission channel 50 at the frequency of the signal transmitted by the first transmission channel 50.

(5) Circuit Configuration of First Impedance Component 13

As shown in FIG. 2, the first impedance component 13 includes a first terminal 13a, a second terminal 13b, a third terminal 13c, and a fourth terminal 13d. The first terminal 13a is connected to the first communication line 51 of the first transmission channel 50. The second terminal 13b is connected to the second communication line 52 of the first transmission channel 50. The third terminal 13c is connected to the first terminal 12a of the communication unit 12 via the first internal wire 17. The fourth terminal 13d is connected to the second terminal 12b of the communication unit 12 via the second internal wire 18.

Figure 3A:
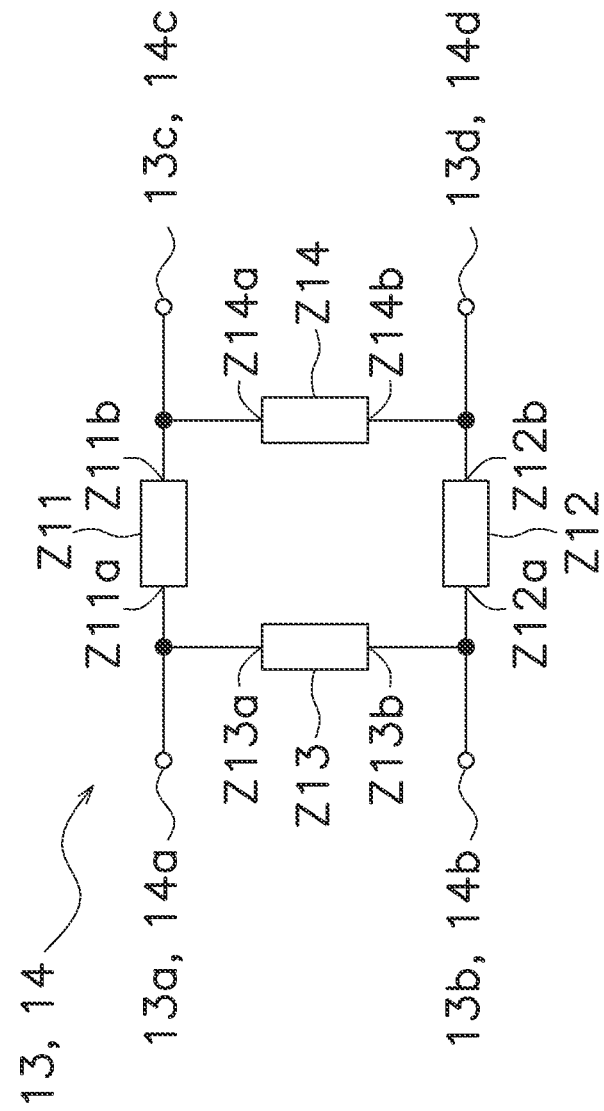
FIG. 3A is a circuit diagram of impedance components 13 and 14.

FIG. 3A shows an example of a circuit configuration of the first impedance component 13 and the second impedance component 14. The first impedance component 13 will be described below with reference to FIG. 3A.

The first impedance component 13 includes a first element Z11, a second element Z12, a third element Z13, and a fourth element Z14.

The first element Z11 has a first end Z11a and a second end Z11b. The first end Z11a of the first element Z11 is connected to the first communication line 51. The second end Z11b of the first element Z11 is connected to the first terminal 12a of the communication unit 12.

The second element Z12 has a first end Z12a and a second end Z12b. The first end Z12a of the second element Z12 is connected to the second communication line 52. The second end Z11b of the second element Z12 is connected to the second terminal 12b of the communication unit 12.

The third element Z13 has a first end Z13a and a second end Z13b. The first end Z13a of the third element Z13 is connected to the first end Z11a of the first element Z11. The second end Z13b of the third element Z13 is connected to the first end Z12a of the second element Z12.

The fourth element Z14 has a first end Z14a and a second end Z14b. The first end Z14a of the fourth element Z14 is connected to the second end Z11b of the first element Z11. The second end Z14b of the fourth element Z14 is connected to the second end Z12b of the second element Z12.

(6) Circuit Configuration of Second Impedance Component 14

As shown in FIG. 2, the second impedance component 14 has a first terminal 14a, a second terminal 14b, a third terminal 14c, and a fourth terminal 14d. The first terminal 14a is connected to the third communication line 61 of the second transmission channel 60. The second terminal 14b is connected to the fourth communication line 62 of the second transmission channel 60. The third terminal 14c is connected to the first terminal 12a of the communication unit 12 via the first internal wire 17. The fourth terminal 14d is connected to the second terminal 12b of the communication unit 12 via the second internal wire 18.

Referring again to FIG. 3A, the second impedance component 14 will be described.

The second impedance component 14 includes a first element Z11, a second element Z12, a third element Z13, and a fourth element Z14.

The first element Z11 has a first end Z11a and a second end Z11b. The first end Z11a of the first element Z11 is connected to the third communication line 61. The second end Z11b of the first element Z11 is connected to the first terminal 12a of the communication unit 12.

The second element Z12 has a first end Z12a and a second end Z12b. The first end Z12a of the second element Z12 is connected to the fourth communication line 62. The second end Z11b of the second element Z12 is connected to the second terminal 12b of the communication unit 12.

The third element Z13 has a first end Z13a and a second end Z13b. The first end Z13a of the third element Z13 is connected to the first end Z11a of the first element Z11. The second end Z13b of the third element Z13 is connected to the first end Z12a of the second element Z12.

The fourth element Z14 has a first end Z14a and a second end Z14b. The first end Z14a of the fourth element Z14 is connected to the second end Z11b of the first element Z11. The second end Z14b of the fourth element Z14 is connected to the second end Z12b of the second element Z12.

(7) Configuration of Element Z

Figure 4A:
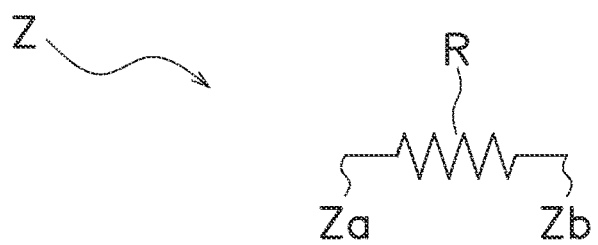
FIG. 4A is a schematic diagram of an element Z.
Figure 4B:
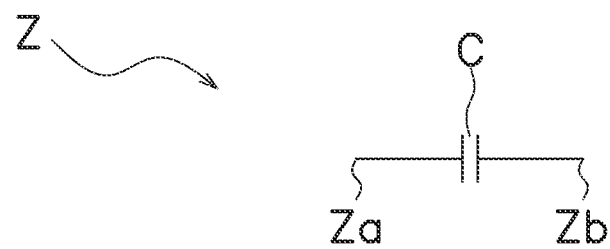
FIG. 4B is a schematic diagram of the element Z.
Figure 4C:
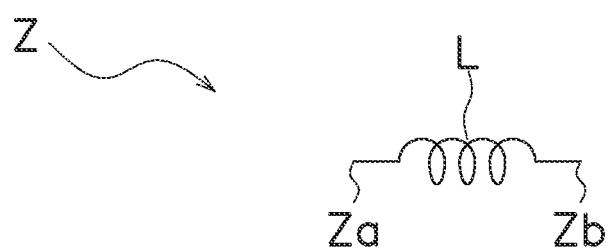
FIG. 4C is a schematic diagram of the element Z.

For all of the first element Z11, the second element Z12, the third element Z13, and the fourth element Z14 described above with reference to FIG. 3A, elements Z shown in FIGS. 4A to 4C may be included. In FIG. 4A, the element Z having a first end Za and a second end Zb is a resistor R. In FIG. 4B, the element Z is a capacitor C. In FIG. 4C, the element Z is an inductor L.

(8) Features (8-1)

A short-circuit state occurring in one of the first transmission channel 50 and the plurality of second transmission channels 60 is not transmitted to another transmission channel of the first transmission channel 50 and the plurality of second transmission channels 60 in which a short-circuit state is not occurring, due to the interposition of the first impedance component 13 and the second impedance component 14. As a result, communication between the controller 70 or the air-conditioning indoor unit 20 connected to the other transmission channel is not hindered. Therefore, the controller 70 or the air-conditioning indoor unit 20 can continue to operate.

(8-2)

Because the first transmission channel 50 and the second transmission channel 60 are electrically connected via the air-conditioning outdoor units 10a to 10e, the air-conditioning outdoor units 10a to 10e do not relay communication. That is, the air-conditioning outdoor units 10a to 10e do not perform a process of first receiving a signal from the first transmission channel 50 and then transmitting a signal onto the second transmission channel 60. Therefore, the communication traffic can be improved.

(8-3)

When a failure such as a short circuit of a communication line occurs both in the first transmission channel 50 and in the second transmission channel 60, the failure does not spread to the communication unit 12 of the air-conditioning outdoor unit 10. Therefore, the air-conditioning outdoor unit 10 can operate normally.

(8-4)

A signal transmitted by the first transmission channel 50 is attenuated before being received by the communication unit 12, regardless of the presence or absence of a short circuit or the like occurring in the first transmission channel 50. Therefore, the communication unit 12 is less likely to be affected by a short circuit or the like.

(8-5)

The first impedance component 13 and the second impedance component 14 are mounted on the circuit board 15. Therefore, it is easy to introduce the first impedance component 13 and the second impedance component 14 into the air-conditioning outdoor unit 10.

(8-6)

The first impedance component 13 and the second impedance component 14 are composed of a resistor R, a capacitor C, and an inductor L. Therefore, the first impedance component 13 and the second impedance component 14 can realize a stable impedance.

(8-7)

Due to the presence of the first impedance component 13 and the second impedance component 14, the adverse effect of a communication failure is less likely to spread among the plurality of air conditioner refrigerant systems 30a to 30e.

(8-8)

The controller 70 is connected only to the first transmission channel 50. Therefore, the adverse effect of the failure of the controller 70 is unlikely to spread to the second transmission channel 60.

Modifications of First Embodiment (9) Modifications (9-1) First Modification

Figure 3B:
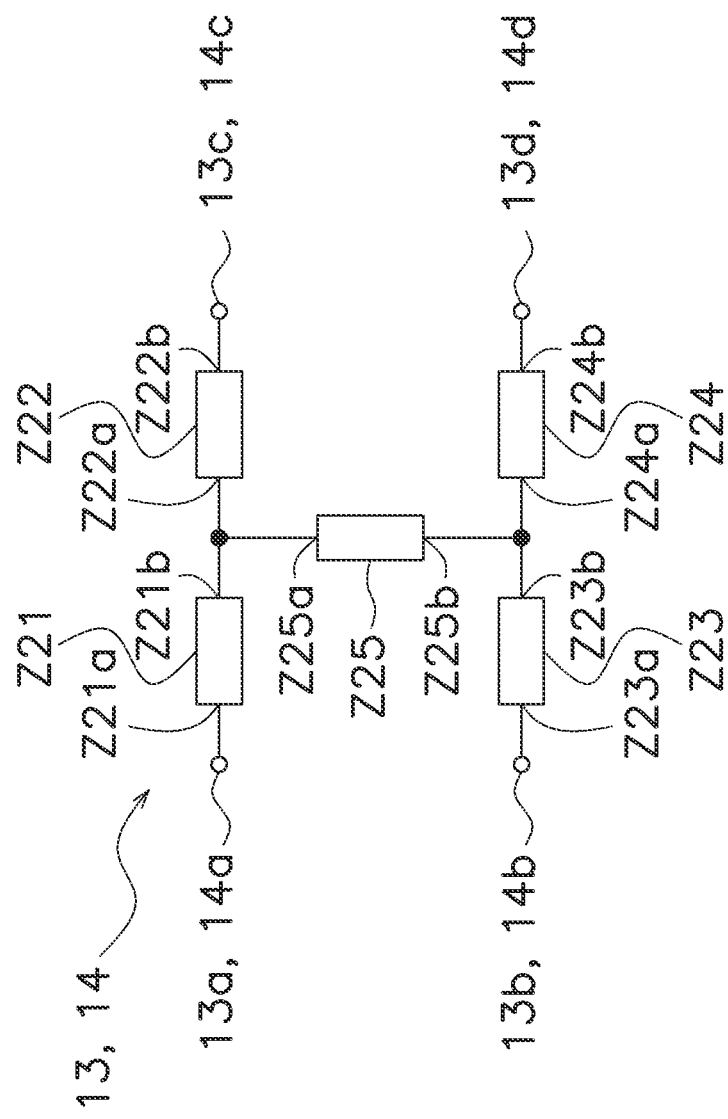
FIG. 3B is a circuit diagram of the impedance components 13 and 14.

FIG. 3B shows a circuit configuration according to a first modification of the first embodiment. At least one of the first impedance component 13 and the second impedance component 14 may have the circuit configuration of FIG. 3B according to the first modification, instead of the circuit configuration of FIG. 3A.

The impedance components include a first element $Z21$, a second element $Z22$, a third element $Z23$, a fourth element $Z24$, and a fifth element $Z25$.

The first element $Z21$ has a first end $Z21a$ and a second end $Z21b$. The first end $Z21a$ of the first element $Z21$ is connected to the first communication line 51 or the third communication line 61.

The second element $Z22$ has a first end $Z22a$ and a second end $Z22b$. The first end $Z22a$ of the second element $Z22$ is connected to the second end $Z21b$ of the first element $Z21$. The second end $Z21b$ of the second element $Z22$ is connected to the first terminal 12a of the communication unit 12.

The third element $Z23$ has a first end $Z23a$ and a second end $Z23b$. The first end $Z23a$ of the third element $Z23$ is connected to the second communication line 52 or the fourth communication line 62.

The fourth element $Z24$ has a first end $Z24a$ and a second end $Z24b$. The first end $Z24a$ of the fourth element $Z24$ is connected to the second end $Z23b$ of the third element $Z23$. The second end $Z24b$ of the fourth element $Z24$ is connected to the second terminal 12b of the communication unit 12.

The fifth element $Z25$ has a first end $Z25a$ and a second end $Z25b$. The first end $Z25a$ of the fifth element $Z25$ is connected to the second end $Z11b$ of the first element $Z11$. The second end $Z25b$ of the fifth element $Z25$ is connected to the second end $Z23b$ of the third element $Z23$.

With this configuration as well, the controller 70 or the air-conditioning indoor unit 20 that is not related to the cause of the short circuit can continue communication and operation.

(9-2) Second Modification

Figure 3C:
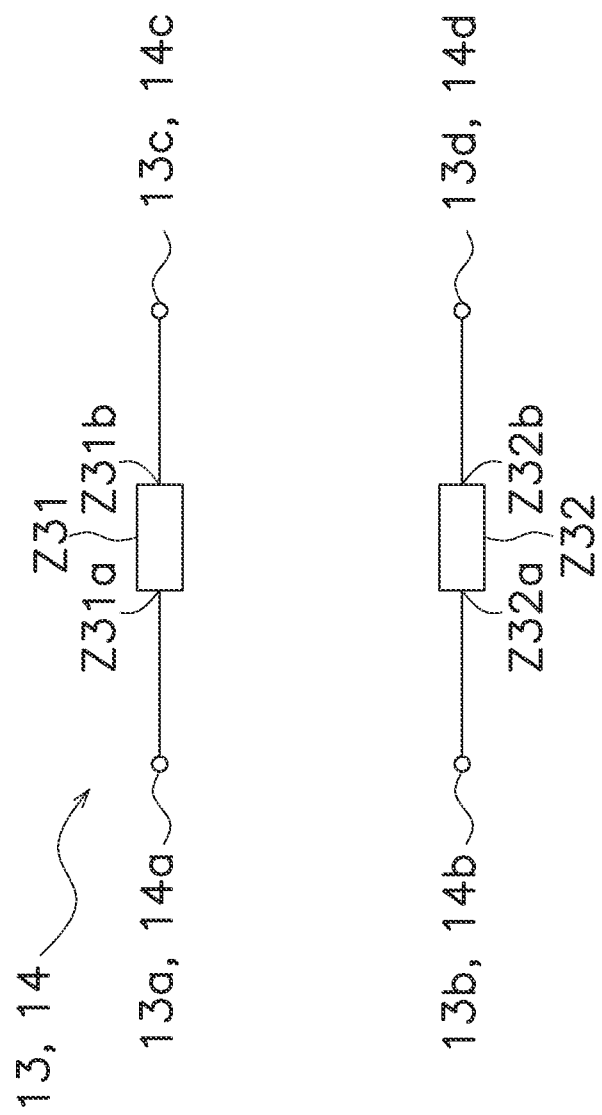
FIG. 3C is a circuit diagram of the impedance components 13 and 14.

FIG. 3C shows a circuit configuration according to a second modification of the first embodiment. At least one of the first impedance component 13 and the second impedance component 14 may have the circuit configuration of FIG. 3C according to the second modification, instead of the circuit configuration of FIG. 3A.

The impedance component has a first element $Z31$ and a second element $Z32$.

The first element $Z31$ has a first end $Z31a$ and a second end $Z31b$. The first end $Z31a$ of the first element $Z31$ is connected to the first communication line 51 or the third communication line 61. The second end $Z31b$ of the first element $Z31$ is connected to the first terminal 12a of the communication unit 12.

The second element $Z32$ has a first end $Z32a$ and a second end $Z32b$. The first end $Z32a$ of the second element $Z32$ is connected to the second communication line or the fourth communication line. The second end $Z31b$ of the second element $Z32$ is connected to the second terminal 12b of the communication unit 12.

With this configuration as well, the controller 70 or the air-conditioning indoor unit 20 that is not related to the cause of the short circuit can continue communication and operation.

(9-3) Third Modification

Figure 3D:
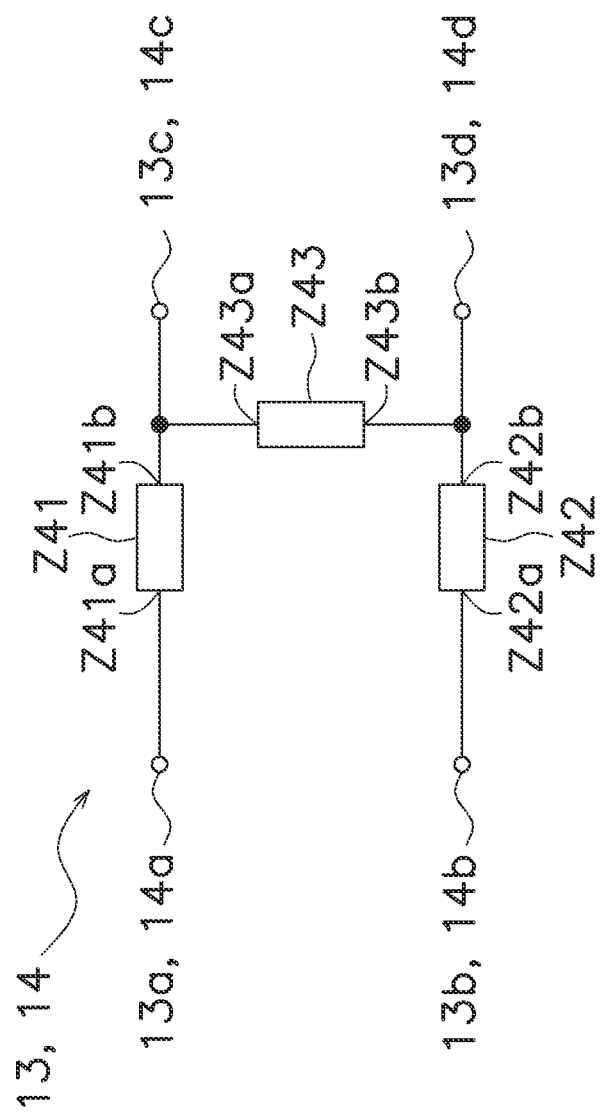
FIG. 3D is a circuit diagram of the impedance components 13 and 14.

FIG. 3D shows a circuit configuration according to a third modification of the first embodiment. At least one of the first impedance component 13 and the second impedance component 14 may have the circuit configuration of FIG. 3D according to the third modification, instead of the circuit configuration of FIG. 3A.

The impedance components include a first element $Z41$, a second element $Z42$, and a third element $Z43$.

The first element $Z41$ has a first end $Z41a$ and a second end $Z41b$. The first end $Z41a$ of the first element $Z41$ is connected to the first communication line 51 or the third communication line 61. The second end $Z41b$ of the first element $Z41$ is connected to the first terminal 12a of the communication unit 12.

The second element $Z42$ has a first end $Z42a$ and a second end $Z42b$. The first end $Z42a$ of the second element $Z42$ is connected to the second communication line 52 or the fourth communication line 62. The second end $Z42b$ of the second element $Z42$ is connected to the second terminal 12b of the communication unit 12.

The third element $Z43$ has a first end $Z43a$ and a second end $Z43b$. The first end $Z43a$ of the third element $Z43$ is connected to the second end $Z41b$ of the first element $Z41$. The second end $Z43b$ of the third element $Z43$ is connected to the second end $Z42b$ of the second element $Z42$.

With this configuration as well, the controller 70 or the air-conditioning indoor unit 20 that is not related to the cause of the short circuit can continue communication and operation.

(9-4) Fourth Modification

Figure 3E:
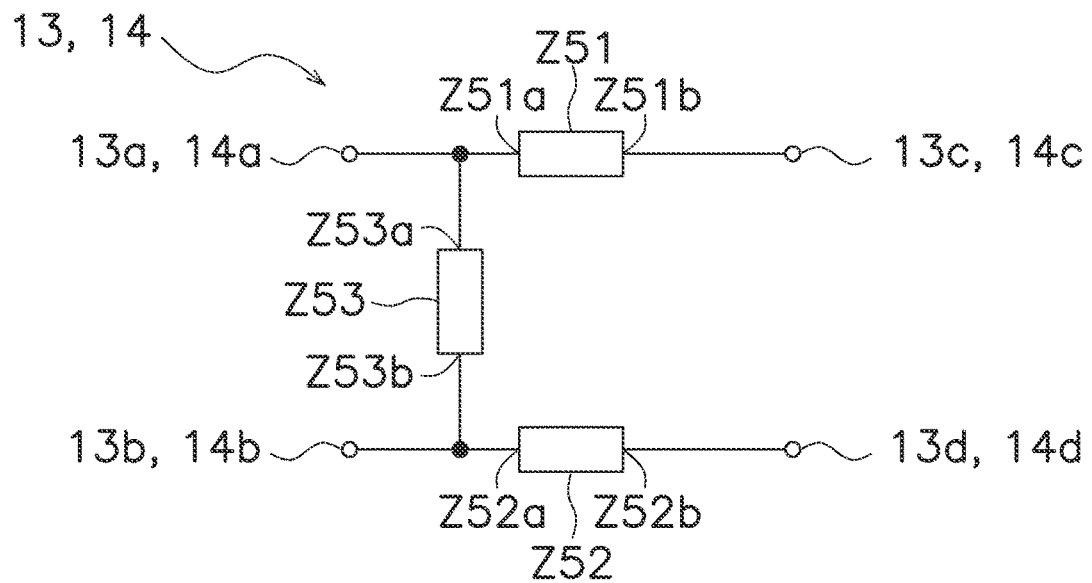
FIG. 3E is a circuit diagram of the impedance components 13 and 14.

FIG. 3E shows a circuit configuration according to a fourth modification of the first embodiment. At least one of the first impedance component 13 and the second impedance component 14 may have the circuit configuration of FIG. 3E according to the fourth modification, instead of the circuit configuration of FIG. 3A.

The impedance component includes a first element $Z51$, a second element $Z52$, and a third element $Z53$.

The first element $Z51$ has a first end $Z51a$ and a second end $Z51b$. The first end $Z51a$ of the first element $Z51$ is connected to the first communication line 51 or the third communication line 61. The second end $Z51b$ of the first element $Z51$ is connected to the first terminal 12a of the communication unit 12.

The second element $Z52$ has a first end $Z52a$ and a second end $Z52b$. The first end $Z52a$ of the second element $Z52$ is connected to the second communication line 52 or the fourth communication line 62. The second end $Z52b$ of the second element $Z52$ is connected to the second terminal 12b of the communication unit 12.

The third element $Z53$ has a first end $Z53a$ and a second end $Z53b$. The first end $Z53a$ of the third element $Z53$ is connected to the first end $Z51a$ of the first element $Z51$. The second end $Z53b$ of the third element $Z53$ is connected to the first end $Z52a$ of the second element $Z52$.

With this configuration as well, the controller 70 or the air-conditioning indoor unit 20 that is not related to the cause of the short circuit can continue communication and operation.

(9-5) Fifth Modification

Only one of the first impedance component 13 and the second impedance component 14 may be mounted on the circuit board 15.

(9-6) Sixth Modification

Figure 5:
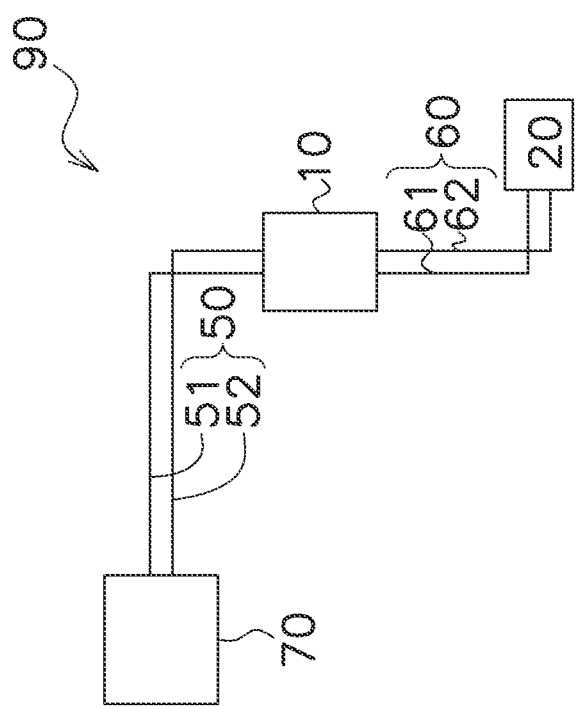
FIG. 5 is a schematic diagram of a circuit of a communication network system 90 according to a sixth modification of the first embodiment.

FIG. 5 shows a circuit of a communication network system 90 according to a sixth modification of the first embodiment of the present disclosure. The sixth modification of the first embodiment is different from the first embodiment shown in FIG. 1 in the number of devices.

As shown in FIG. 5, the communication network system 90 according to the sixth modification of the first embodiment includes one air-conditioning outdoor unit 10, one air-conditioning indoor unit 20, and one second transmission channel 60.

When a short-circuit state occurs in the first transmission channel 50, communication between the controller 70 and the air-conditioning outdoor unit 10 becomes impossible.

However, even in this case, communication between the air-conditioning outdoor unit 10 and the air-conditioning indoor unit 20 is possible. Therefore, the air-conditioning outdoor unit 10 and the air-conditioning indoor unit 20 can continue to operate as an air-conditioning system or an air-conditioning apparatus.

The communication network system 90 may include one air-conditioning outdoor unit 10 and a plurality of air-conditioning indoor units 20.

Second Embodiment (1) Overall configuration

The second embodiment differs from the first embodiment in the configuration of the air-conditioning outdoor units 10a to 10e.

The communication network system 90 according to the second embodiment of the present disclosure includes the circuit shown in FIG. 1 as in the first embodiment. Specifically, the communication network system 90 includes a controller 70, a plurality of air-conditioning outdoor units 10a to 10e, a plurality of air-conditioning indoor units 20aa to 20ef, a first transmission channel 50, and a plurality of second transmission channels 60a to 60e.

(2) Configuration of Air-Conditioning Outdoor Units 10a to 10e

Figure 6:
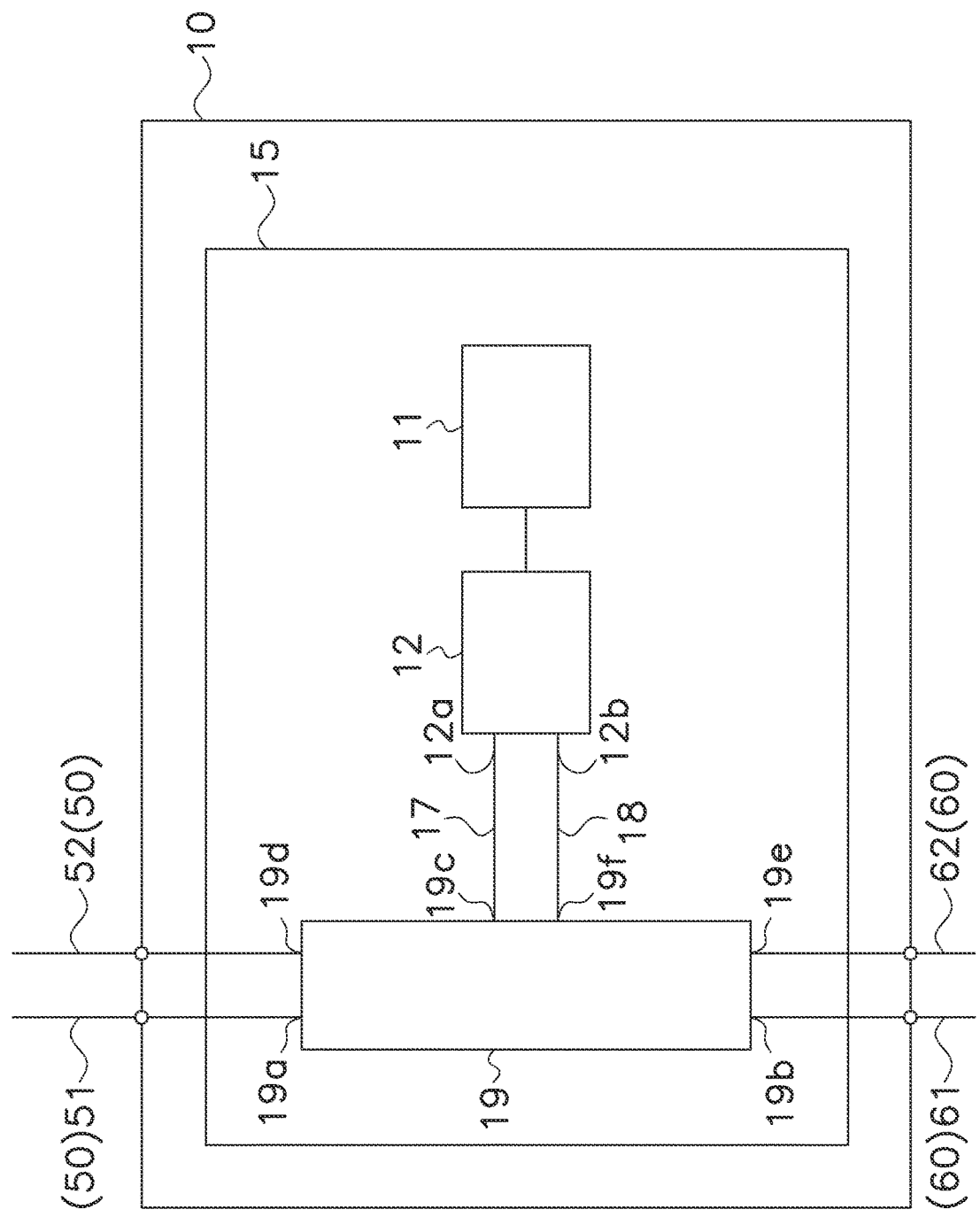
FIG. 6 is a block diagram of an air-conditioning outdoor unit 10 according to a second embodiment.

FIG. 6 shows an internal configuration of the air-conditioning outdoor unit 10 of the second embodiment. The internal configurations of the plurality of air-conditioning outdoor units 10a to 10e shown in FIG. 1 are identical or similar to the configuration of the air-conditioning outdoor unit 10 shown in FIG. 6.

As shown in FIG. 6, the air-conditioning outdoor unit 10 includes a refrigerant circuit control unit 11, a communication unit 12, an impedance component 19, and a circuit board 15. The circuit board 15 includes a first internal wire 17 and a second internal wire 18. At least the impedance component 19 is mounted on the circuit board 15. The refrigerant circuit control unit 11 and the communication unit 12 may also be mounted on the circuit board 15.

The functions of the refrigerant circuit control unit 11 and the communication unit 12 are the same as in the first embodiment. The communication unit 12 includes a first terminal 12a and a second terminal 12b. The first terminal 12a is connected to the first internal wire 17. The second terminal 12b is connected to the second internal wire 18.

The impedance component 19 is a circuit having a predetermined impedance. The impedance component 19 is disposed between the first transmission channel 50, the second transmission channel 60 (that is, any one of the plurality of second transmission channels 60a to 60e described above), and the communication unit 12.

The impedance of the impedance component 19 is larger than the characteristic impedance of the first transmission channel 50 at the frequency of the signal transmitted by the first transmission channel 50.

(3) Circuit Configuration of Impedance Component 19

As shown in FIG. 6, the impedance component 19 includes a first terminal 19a, a second terminal 19b, a third terminal 19c, a fourth terminal 19d, a fifth terminal 19e, and a sixth terminal 19f. The first terminal 19a is connected to the first communication line 51 of the first transmission channel 50. The second terminal 19b is connected to the first communication line 61 of the second transmission channel 60. The third terminal 19c is connected to the first terminal 12a of the communication unit 12 via the first internal wire 17. The fourth terminal 19d is connected to the second communication line 52 of the first transmission channel 50. The fifth terminal 19e is connected to the second communication line 62 of the second transmission channel 60. The sixth terminal 19f is connected to the second terminal 12b of the communication unit 12 via the second internal wire 18.

Figure 7:
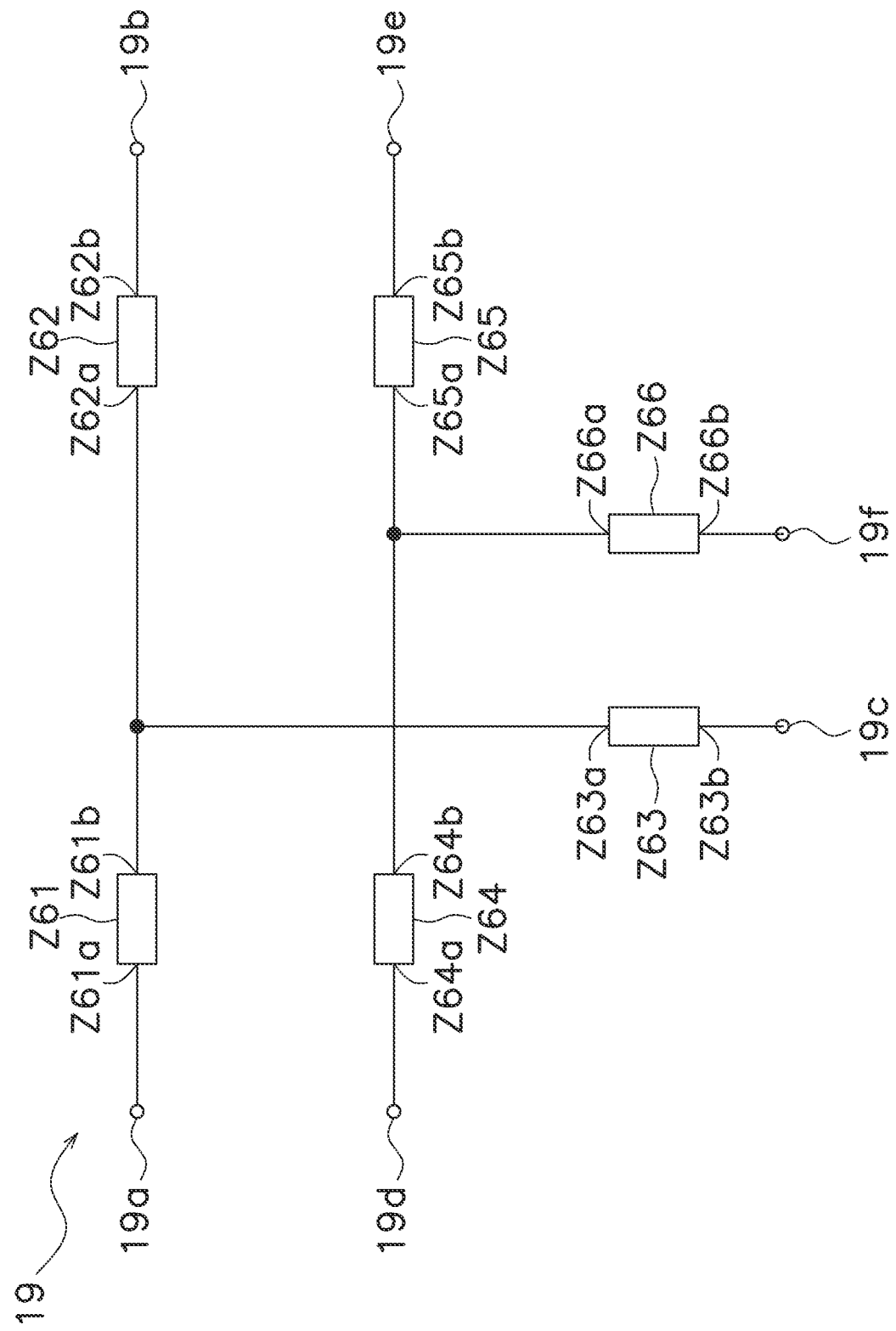
FIG. 7 is a circuit diagram of an impedance component 19.

FIG. 7 shows an example of a circuit configuration of the impedance component 19. The impedance component 19 includes a first element Z61, a second element Z62, a third element Z63, a fourth element Z64, a fifth terminal Z65, and a sixth terminal Z66.

The first element Z61 has a first end Z61a and a second end Z61b. The first end Z61a of the first element Z61 is connected to the first communication line 51.

The second element Z62 has a first end Z62a and a second end Z62b. The first end Z62a of the second element Z62 is connected to the second end 61b of the first element 61. The second end Z62b of the second element Z62 is connected to the third communication line 61.

The third element Z63 has a first end Z63a and a second end Z63b. The first end Z63a of the third element Z63 is connected to the second end Z61b of the first element Z61. The second end Z63b of the third element Z63 is connected to the first terminal 12a of the communication unit 12.

The fourth element Z64 has a first end Z64a and a second end Z64b. The first end Z64a of the fourth element Z64 is connected to the second communication line 52.

The fifth element Z65 has a first end Z65a and a second end Z65b. The first end Z65a of the fifth element Z65 is connected to the second end 64b of the fourth element 64. The second end Z65b of the fifth element Z65 is connected to the fourth communication line 62.

The sixth element Z66 has a first end Z66a and a second end Z66b. The first end Z66a of the sixth element Z66 is connected to the second end Z64b of the fourth element Z64. The second end Z66b of the sixth element Z66 is connected to the second terminal 12b of the communication unit 12.

(4) Configuration of Element Z

All of the first element Z61, the second element Z62, the third element Z63, the fourth element Z64, the fifth element Z65, and the sixth element Z66 described above with reference to FIG. 7 may include the element Z shown in FIGS. 4A to 4C. In FIG. 4A, the element Z having a first end Za and a second end Zb is a resistor R. In FIG. 4B, the element Z is a capacitor C. In FIG. 4C, the element Z is an inductor L.

(5) Features

When a failure such as a short circuit of a communication line occurs in one of the first transmission channel 50 and the second transmission channel 60, the failure does not spread to the other. Therefore, it is possible to suppress the occurrence of a situation in which communication cannot be performed both in the first transmission channel 50 and in the second transmission channel 60.

In addition, because the first transmission channel 50 and the second transmission channel 60 are electrically connected via the air-conditioning outdoor units 10a to 10e, the air-conditioning outdoor units 10a to 10e do not relay communication. That is, the air-conditioning outdoor units 10a to 10e do not perform a process of first receiving a signal from the first transmission channel 50 and then transmitting a signal onto the second transmission channel 60. Therefore, the communication traffic can be improved. Modifications of Second Embodiment (6) Modifications Some of the plurality of air-conditioning outdoor units 10a to 10e may have the configuration of the air-conditioning outdoor unit 10 according to the first embodiment.

While embodiments of the present disclosure have been described above, it will be understood that various changes in form and detail may be made therein without departing from the spirit and scope of the present disclosure as set forth in the appended claims.

The invention claimed is:

1. An air-conditioning apparatus comprising:
a first transmission channel;
a plurality of second transmission channels different from the first transmission channel;
a controller connected to the first transmission channel and not connected to the second transmission channels;
a plurality of air-conditioning indoor units connected to the second transmission channels and not connected to the first transmission channel; and
a plurality of air-conditioning outdoor units electrically connecting the first transmission channel and the second transmission channels, and not transmitting a short-circuit state occurring in one of the first transmission channel and the second transmission channels to a transmission channel other than the one of the first transmission channel and the second transmission channels, thereby enabling communication between devices connected to the transmission channel other than the one,
each of the plurality of air-conditioning outdoor units electrically connecting the first transmission channel and one of the plurality of second transmission channels,
each of the second transmission channels forming an air conditioner refrigerant system together with the air-conditioning indoor unit connected to the second transmission channel and the air-conditioning outdoor unit connected to the second transmission channel,
the first transmission channel connecting a plurality of the air conditioner refrigerant systems to each other,
each of the plurality of air-conditioning outdoor units not transmitting a short-circuit state occurring in one of the first transmission channel and the plurality of second transmission channels to a transmission channel other than the one of the first transmission channel and the plurality of second transmission channels, thereby enabling communication between the controller or the air-conditioning indoor unit connected to the transmission channel other than the one of the first transmission channel and the plurality of second transmission channels,
each of the plurality of air-conditioning outdoor units includes a communication unit configured to transmit and receive a signal, and
each of the plurality of air-conditioning outdoor units includes an impedance component.

2. The air-conditioning apparatus according to claim 1, wherein
the impedance component has an impedance larger than a characteristic impedance of the first transmission channel at a frequency of a signal transmitted by the first transmission channel.

3. The air-conditioning apparatus according to claim 2, wherein
each of the plurality of air-conditioning outdoor units includes a circuit board, and
the impedance component is mounted on the circuit board.

4. The air-conditioning apparatus according to claim 2, wherein
the first transmission channel includes a first communication line and a second communication line,
each of the plurality of second transmission channels includes a third communication line and a fourth communication line, and
the impedance component includes at least one of a resistor, a capacitor, and an inductor connected directly or via another element to at least one of the first communication line, the second communication line, the third communication line, and the fourth communication line.

5. The air-conditioning apparatus according to claim 1, wherein
each of the plurality of air-conditioning outdoor units includes a circuit board, and
the impedance component is mounted on the circuit board.

6. The air-conditioning apparatus according to claim 5, wherein
the first transmission channel includes a first communication line and a second communication line,
each of the plurality of second transmission channels includes a third communication line and a fourth communication line, and
the impedance component includes at least one of a resistor, a capacitor, and an inductor connected directly or via another element to at least one of the first communication line, the second communication line, the third communication line, and the fourth communication line.

7. The air-conditioning apparatus according to claim 1, wherein
the first transmission channel includes a first communication line and a second communication line,
each of the plurality of second transmission channels includes a third communication line and a fourth communication line, and
the impedance component includes at least one of a resistor, a capacitor, and an inductor connected directly or via another element to at least one of the first communication line, the second communication line, the third communication line, and the fourth communication line.

8. The air-conditioning apparatus according to claim 7, wherein
the first transmission channel includes a first communication line and a second communication line,
each of the plurality of second transmission channels includes a third communication line and a fourth communication line,
the impedance component includes
a first element having a first end connected to the first communication line, and a second end,
a second element having a first end connected to the second end ($Z61b$) of the first element, and a second end connected to the third communication line,
a third element having a first end connected to the second end ($Z61b$) of the first element, and a second end,
a fourth element having a first end connected to the second communication line, and a second end,
a fifth element having a first end connected to the second end of the fourth element, and a second end connected to the fourth communication line, and
a sixth element having a first end connected to the second end of the fourth element, and a second end, and all of the first element, the second element, the third element, the fourth element, the fifth element, and the sixth element include at least one of the resistor, the capacitor, and the inductor.

9. The air-conditioning apparatus according to claim 7, wherein
each of the plurality of air-conditioning outdoor units includes a first impedance component and a second impedance component as the impedance component,
the first impedance component is disposed between the first transmission channel and the communication unit, and
the second impedance component is disposed between any of the plurality of second transmission channels and the communication unit.

10. The air-conditioning apparatus according to claim 9, wherein
the impedance component includes
a first element having a first end connected to the first communication line or the third communication line, and a second end connected to a first terminal of the communication unit,
a second element having a first end connected to the second communication line or the fourth communication line, and a second end connected to a second terminal of the communication unit,
a third element having a first end connected to the first end of the first element, and a second end connected to the first end of the second element, and
a fourth element having a first end connected to the second end of the first element, and a second end connected to the second end of the second element, and
all of the first element, the second element, the third element, and the fourth element include at least one of the resistor, the capacitor, and the inductor.

11. The air-conditioning apparatus according to claim 9, wherein
the impedance component includes
a first element having a first end connected to the first communication line or the third communication line, and a second end,
a second element having a first end connected to the second end of the first element, and a second end connected to a first terminal of the communication unit,
a third element having a first end connected to the second communication line or the fourth communication line, and a second end,
a fourth element having a first end connected to the second end of the third element, and a second end connected to a second terminal of the communication unit, and
a fifth element having a first end connected to the second end of the first element, and a second end connected to the second end of the third element, and
all of the first element, the second element, the third element, the fourth element, and the fifth element include at least one of the resistor, the capacitor, and the inductor.

12. The air-conditioning apparatus according to claim 9, wherein
the impedance component includes
a first element having a first end connected to the first communication line or the third communication line, and a second end connected to a first terminal of the communication unit, and
a second element having a first end connected to the second communication line or the fourth communication line, and a second end connected to a second terminal of the communication unit, and
both the first element and the second element include at least one of the resistor, the capacitor, and the inductor.

13. The air-conditioning apparatus according to claim 9, wherein
the impedance component includes
a first element having a first end connected to the first communication line or the third communication line, and a second end connected to a first terminal of the communication unit,
a second element having a first end connected to the second communication line or the fourth communication line, and a second end connected to a second terminal of the communication unit, and
a third element having a first end connected to the second end of the first element, and a second end connected to the second end of the second element, and
all of the first element, the second element, and the third element include at least one of the resistor, the capacitor, and the inductor.

14. The air-conditioning apparatus according to claim 9, wherein
the impedance component includes
a first element having a first end connected to the first communication line or the third communication line, and a second end connected to a first terminal of the communication unit,
a second element having a first end connected to the second communication line or the fourth communication line, and a second end connected to a second terminal of the communication unit, and
a third element having a first end connected to the first end of the first element, and a second end connected to the first end of the second element, and
all of the first element, the second element, and the third element include at least one of the resistor, the capacitor, and the inductor.

15. An air-conditioning outdoor unit electrically connecting a first transmission channel and a second transmission channel different from the first transmission channel, and forming an air-conditioning apparatus in cooperation with a controller and an air-conditioning indoor unit,
the air-conditioning apparatus including a plurality of the second transmission channels, a plurality of the air-conditioning indoor units, and a plurality of the air-conditioning outdoor units,
the air-conditioning outdoor unit electrically connecting the first transmission channel and one of the plurality of second transmission channels, and
the air-conditioning outdoor unit not transmitting a short-circuit state occurring in one of the first transmission channel and the plurality of second transmission channels to a transmission channel other than the one of the first transmission channel and the plurality of second transmission channels, thereby enabling communication between the controller or the air-conditioning indoor unit connected to the transmission channel other than the one, the air-conditioning outdoor unit including
a communication unit; and
an impedance component disposed between at least one of the first transmission channel and the second transmission channels and the communication unit.

\* \* \* \* \*